United States Patent
Hertlein et al.

(10) Patent No.: US 8,398,946 B2
(45) Date of Patent: Mar. 19, 2013

(54) POLYCRYSTALLINE SILICON AND METHOD FOR THE PRODUCTION THEREOF

(75) Inventors: Harald Hertlein, Burghausen (DE); Oliver Kraetzschmar, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 327 days.

(21) Appl. No.: 12/680,322

(22) PCT Filed: Sep. 22, 2008

(86) PCT No.: PCT/EP2008/062610
§ 371 (c)(1),
(2), (4) Date: Mar. 26, 2010

(87) PCT Pub. No.: WO2009/047107
PCT Pub. Date: Apr. 16, 2009

(65) Prior Publication Data
US 2010/0219380 A1    Sep. 2, 2010

(30) Foreign Application Priority Data
Oct. 2, 2007 (DE) .................. 10 2007 047 210

(51) Int. Cl.
*C01B 33/00* (2006.01)

(52) U.S. Cl. .......... 423/348; 428/402; 427/588; 117/2; 117/3; 117/13; 252/500

(58) Field of Classification Search .................. 423/348; 427/588; 117/2, 3, 13; 428/402; 252/500
See application file for complete search history.

(56) References Cited

U.S. PATENT DOCUMENTS

| | | | |
|---|---|---|---|
| 6,309,467 B1 | 10/2001 | Wochner et al. | |
| 6,350,313 B2 * | 2/2002 | Kraus et al. | 117/13 |
| 6,360,755 B1 | 3/2002 | Schantz et al. | |
| 6,749,824 B2 * | 6/2004 | Dawson et al. | 423/348 |
| 7,736,439 B2 * | 6/2010 | Wochner et al. | 134/2 |
| 7,950,600 B2 * | 5/2011 | Gruebl et al. | 241/30 |
| 8,074,905 B2 * | 12/2011 | Schaefer et al. | 241/1 |
| 2003/0150378 A1 | 8/2003 | Winterton et al. | |
| 2008/0069755 A1 * | 3/2008 | Hongu et al. | 423/348 |
| 2009/0191112 A1 | 7/2009 | Moon et al. | |

FOREIGN PATENT DOCUMENTS

| | | |
|---|---|---|
| EP | 0905796 A1 | 3/1999 |
| EP | 0976457 A1 | 2/2000 |
| JP | 05004811 A | 1/1993 |
| JP | 2004-149324 A2 | 5/2004 |
| JP | 2006240934 A | 9/2006 |
| WO | 2005/123583 | * 12/2005 |

OTHER PUBLICATIONS

Semi draft document 3083, Semiconductor Equipment and Materials international, 805 East Middlefield Road, Mountain View, CA 84043-4080, Document No. 3083, Revition N/A, Date Jul. 22, 1999.
Handbook of Semiconductor Silicon Technology. William C. O'Mara, Robert B. Herring, and Lee P. Hunt Noyes Publications, Park Ridge, new Jersey, USA, 1990, pp. 1 to 81.
Semi, 3081 Zanker Road, San Jose, CA 95134, USA, Sep. 1, 2004.

* cited by examiner

*Primary Examiner* — Steven Bos
(74) *Attorney, Agent, or Firm* — Brooks Kushman P.C.

(57) ABSTRACT

Brittle polysilicon rods having a rod cross-section of 80-99% available for electrical conduction and a flexural strength of 0.1 to 80 N/mm$^2$ are produced by a process wherein the temperature of the bridge of polysilicon rods in the Siemens process is held at a high temperature and the flow rate of chlorosilanes is increased to the maximum within a short time. The rods are easily fragmented with low force, resulting in polysilicon with a low level of metallic impurities.

14 Claims, 1 Drawing Sheet

POLYCRYSTALLINE SILICON AND METHOD FOR THE PRODUCTION THEREOF

CROSS-REFERENCE TO RELATED APPLICATION

This application is the U.S. national phase of PCT Appln. No. PCT/EP2008/062610 filed Sep. 22, 2008 which claims priority to German application DE 10 2007 047 210.4 filed Oct.2, 2007.

BACKGROUND OF THE INVENTION

1. Field of the Invention

The invention relates to polycrystalline silicon for semiconductor and photovoltaic applications, and to a process for production thereof.

2. Description of the Related Art

Polycrystalline silicon (polysilicon) serves as a starting material for producing monocrystalline silicon for semiconductors by the Czochralski (CZ) or float zone (FZ) process, and for producing mono- or polycrystalline silicon by different pulling and casting processes for production of solar cells for photovoltaics. It is generally produced by means of the Siemens process. In this process, thin filament rods of silicon are heated by direct passage of current in a bell-shaped reactor ("Siemens reactor"), and a reaction gas comprising a silicon-containing component and hydrogen is introduced. The silicon-containing component of the reaction gas is generally monosilane or a halosilane of the general composition $SiH_nX_{4-n}$ n=0, 1, 2, 3; X=Cl, Br, I). It is preferably a chlorosilane (X=Cl), more preferably trichlorosilane (n=1). $SiH_4$ or $SiHCl_3$ is predominantly used in a mixture with hydrogen. The filament rods are inserted vertically into electrodes at the reactor base, through which they are attached to the power supply. High-purity polysilicon is deposited on the heated filament rods and the horizontal bridge, as a result of which the rod diameter grows with time.

The process is controlled through the setting of the rod temperature and reaction gas flow and composition. The rod temperature is measured with radiation pyrometers on the surfaces of the vertical rods. The rod temperature is set by controlling or regulating the electrical power, either at a fixed level or as a function of the rod diameter. The reaction gas rate is set as a function of the rod diameter. The deposition conditions are selected such that the rod diameter grows in the form of homogeneous and hole-free layers, i.e. the silicon rods thus obtained are very substantially free of cracks, pores, seams, fissures, etc., and are thus homogeneous, dense and solid. Such a material and the processing thereof are described, for example, in U.S. Pat. No. 63,50,313B2. The apparent density of such compact polysilicon corresponds to the true density of polysilicon and is 2.329 $g/cm^3$.

The polysilicon rods thus obtained have to be processed to lumps and chips if they are not used for the production of single crystals by the FZ process. To this end, the rods are comminuted with tools such as hammers, crushers or mills and then classified by size. The smaller the fragment size and the higher the strength of the polysilicon rods, the greater the contamination of the polysilicon by the tools.

For the production of monocrystalline and polycrystalline silicon, crucibles are filled with fragments of different size. For the first filling, the aim is a maximum fill level of the crucibles. For this purpose, silicon pieces of very different size and weight, i.e. sawn rod pieces, coarse lumps, small chips and fine material, have to be mixed. The size of the silicon pieces ranges from <1 mm up to pieces of 150 mm and more; the shape of the pieces must not deviate too greatly from the spherical form.

For the multiple refilling of the crucibles, only fine, free-flowing, i.e. substantially spherical, fragments are suitable, since the material has to be conveyed through tubes and fittings into the crucible and must neither damage the crucible nor excessively disturb the silicon melt.

The yield of the crucible pulling operations is limited by the amount of impurities which become enriched in the silicon melt, which are in turn introduced predominantly through the fine silicon fragments.

Since the crystal pulling process is sensitive to the size distribution and form of the polysilicon used, a ratio of width to length (W/L) of the silicon fragments of 0.7 to 1.0 and a sphericity of the silicon fragments of 0.7 to 1.0 has become established as a de facto standard for use in crystal pulling processes. An example of the different fragment size ranges customary on the global market for controlled crucible setup with maximum crucible fill level can be found, for example, on the following web page of Wacker Chemie AG, on which fragment size fractions with a maximum length of the silicon fragments of 5-45 mm, 20-65 mm, 20-150 mm are advertised: (http://www.wacker.com/internet/webcache/en_US/PTM/Poly silicon/PolyChunks/Polysilicon_chunks_etched.pdf).

The length L denotes the maximum dimension of a particle; the width W is the dimension at right angles to the maximum dimension. The sphericity is defined as the diameter of the circle with the same projection area as a particle divided by the diameter of a circle which encloses the particle projection (definition according to Wadell for two-dimensional analysis areas).

US 2003/0150378 A2 discloses "teardrop poly" and a method for producing it. In this method, a compact hole-free high-purity polysilicon rod ("stem") is deposited from monosilane $SiH_4$ by means of the Siemens process at 850° C. and a silane concentration of 1.14 mol % up to a silicon rod diameter of 45 mm. Subsequently, the rod surface temperature is suddenly increased from 850 to 988° C. and the silane concentration is suddenly reduced from 1.14 to 0.15 mol %. This parameter jump suddenly alters the growth of the silicon crystals on the silicon rod, and needles, known as dendrites, grow from the rod surface. Subsequently, the rod surface temperature is lowered continuously, such that the further growth of the needles to form large "teardrops" is continued until the end of the deposition. The "teardrops" are droplet-shaped structures which are connected to the stem only by their narrow ends and are not fused to one another. In the production of silicon fragments, this enables the teardrops to be broken easily off the "stem". This polysilicon and the method for producing it have a series of disadvantages:

The polysilicon rod is very inhomogeneous. It consists of a compact, crack- and fissure-free and hence solid "stem", and the "teardrops" which are separated from one another by cavities and are not fused to one another. Once the "teardrops" have been removed, the stem has to be processed further separately. This means additional work in the form of a two-stage process, possibly even with intermediate storage of material. The relative proportions by mass of stem and teardrops are determined by the separation process. In contrast to a homogeneous material, the size distribution of the comminuted material can therefore no longer be selected freely. Owing to the lack of connection between the teardrops, the current flows exclusively through the stem. The diameter thereof therefore cannot be selected at as low a level as desired, since it would otherwise melt. Since the currents required increase with rising diameter in the deposition, this means that the diameter of the stem must also increase. Thus, only a proportion of the silicon deposited, which decreases with rising rod diameter, is available as teardrops.

The form of the teardrops differs significantly from the fragments obtained from compact silicon rods in terms of size distribution, sphericity and W/L ratio. This material is therefore not usable for production of mono- or polycrystalline silicon without adjustment of the silicon pulling processes.

SUMMARY OF THE INVENTION

It is an object of the present invention to provide a polycrystalline silicon rod which is particularly suitable for use in semiconductor technology and especially in photovoltaics. These and other objects are achieved by a polycrystalline silicon rod which is characterized in that it possesses a rod cross section with an areal proportion of 50-99% silicon available for electrical conduction and the rod has a flexural strength of 0.1 to 80 $N/mm^2$.

DETAILED DESCRIPTION OF THE PREFERRED EMBODIMENTS

Figure 1A:
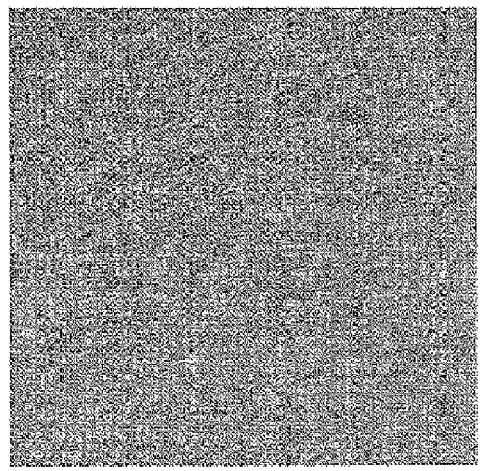
Figs. 1a and 1b show one surface each of cubes of edge length 50 mm of polycrystalline silicon, sawn out of a polysilicon rod produced by means of the Siemens process according to comparative example 1 (left-hand image) and produced from a polysilicon rod according to example 1 (right-hand image).
Figure 1B:
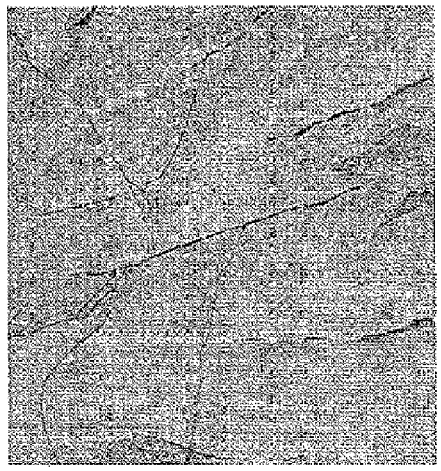

The rod cross section preferably has an areal proportion of 80%-99% silicon available for electrical conduction and most preferably an areal proportion of 90%-99% silicon available for electrical conduction. The rest of the rod cross section is formed by cracks and pores. The electrical conductivity of the silicon rod is barely impaired by the small cracks and pores compared to conventional compact polysilicon.

The rod cross section is preferably determined at right angles to the longitudinal axis of the rod. The areal proportion of silicon and the areal proportion of cracks, pores and seams can be determined by commercially available optical image analyses.

The flexural strength is preferably 0.1 to 16 $N/mm^2$, more preferably 0.5 to 2 $N/mm^2$ and most preferably from 0.5 to less than 1.6 $N/mm^2$.

The rod preferably additionally has a compressive strength of 1 to 100 $N/mm^2$, more preferably 20 to 60 $N/mm^2$. The compressive strength is most preferably 58 $N/mm^2$.

The rod preferably additionally has an apparent density of 2.0 to 2.3 $g/cm^3$, more preferably an apparent density of 2.25 to 2.3 $g/cm^3$. The apparent density is defined as the density of the polysilicon including the pore space in the dry state to DIN EN 1936 (weighing of specimens of defined volume or measurement of the buoyancy of the saturated sample in mercury with a hydrostatic balance).

The deposited polysilicon preferably has a total porosity of 0.01 to 0.2, most preferably of 0.023.

The total porosity of a sample is composed of the sum of the cavities connected to one another and to the environment, and the cavities not connected to one another. The total porosity, i.e. the proportion of the total pore volume (open and closed pores) in the total volume of the polysilicon, is determined to DIN EN 1936 from the calculation of apparent and true density, i.e. total porosity=1−(apparent density/2.329 [$g/cm^3$]).

The flexural strength is determined to DIN 51902. The compressive strength is determined to DIN 51910. The flexural strength of the inventive poly rod is thus 2-3 orders of magnitude below the value for compact polysilicon, on which 160 $N/mm^2$ has been measured. The compressive strength of the inventive poly rod is also considerably lower than the compressive strength of compact polysilicon, which has a compressive strength of approx. 170 $N/mm^2$.

In an inventive polysilicon rod, the silicon layer grown on in the Siemens process has a structure which is homogeneous over the rod radius, which structure comprises pores, seams, gaps, cracks and fissures and causes the reduced strength of the polysilicon rod, but does not limit the flow of current through the rod.

These properties of the inventive polysilicon rod are achieved by a process regime in the deposition process which leads to pores, seams, gaps, cracks and fissures in the deposited silicon, these pores, seams, gaps, cracks and fissures being of such a small size that they do not hinder the flow of current. Thus, in the inventive rod, the current flows as in conventional polysilicon rods over the entire rod cross section, and the disadvantages described for teardrop poly, especially a restriction in the diameter of the rod, do not occur.

The inventive polysilicon rod can be comminuted like a known compact polysilicon rod. It gives the same fragment size distribution, same sphericity and same width/length ratio of the fragments as a known compact polysilicon rod. Advantageously, an inventive polysilicon rod, however, owing to its low strength, can be comminuted with a much lower energy expenditure than a conventional polysilicon rod. The resulting polysilicon fragments therefore have lower surface contamination than standard uncleaned polysilicon fragments. Subsequent cleaning of the polysilicon fragments is therefore unnecessary in many cases, and the production costs of fragments from polycrystalline silicon are lowered further as a result.

The inventive polysilicon rod thus enables inexpensive and low-contamination production of polysilicon fragments of a size, of a width/length ratio and of a sphericity within the range already used as standard in crystal pulling in the past.

The invention therefore also relates to high-purity fragments of polycrystalline silicon of 1 to 150 mm in size, which can be produced from an inventive polysilicon rod without subsequent cleaning. These fragments have a fragment size distribution from 1 to 150 mm, a width/length ratio of 0.7 to 1, a sphericity in the range of 0.7 to 1, and are characterized in that they have a surface with a total of metallic impurities between 1 and 12 ppbw and the surface has less than 62 ppb of nitrate compounds and less than 1 ppb of fluoride compounds.

The metallic impurities on the surface are determined by ICPMS to ASTM F 1724-96. The fluoride and nitrate impurities are determined by means of capillary zone electrophoresis, as described in semidraft document 3083, Semiconductor Equipment and Materials international, 805 East Middlefield Road, Mountain View, Calif. 84043-4080, Document Number: 3083, Revision N/A, Date Jul. 22, 1999.

It is a further object of the invention to provide a process which enables production of an inventive polycrystalline silicon rod.

This process, in which a stream of a reaction gas comprising a chlorosilane mixture and hydrogen is introduced into a reactor and high-purity polysilicon is deposited on a filament rod of silicon heated by direct passage of current, the filament rod being formed from two vertical rods and one horizontal rod, and the horizontal rod forming a linking bridge between the vertical rods, is characterized in that the chlorosilane mixture used is a mixture of di- and trichlorosilane and the passage of current through the filament rod is regulated such that the filament rod has a temperature at the underside of the bridge between 1300 and 1413° C. and the temperature of the reaction gases measured in the reactor is adjusted so as to be not more than 650° C., and the flow rate of the chlorosilane mixture is adjusted to its maximum value within less than 30 hours, preferably within less than 5 hours, from the start of supply of the chlorosilane mixture.

The temperature at the underside of the bridge is referred to hereinafter as bridge temperature, and the temperature of the gases in the reactor as gas temperature.

The dichlorosilane content in the chlorosilane mixture is in the range of 1 to 15 percent by weight, preferably 3 to 10 percent by weight.

In contrast to conventional processes, the flow rate of the chlorosilane mixture, in accordance with the invention, is not increased proportionally to the increasing rod diameter, but the maximum value is instead established considerably more rapidly. The maximum value of the flow rate of the chlorosilane mixture is preferably 350-1000 kg/h of chlorosilane per $m^2$ of silicon rod surface area, most preferably greater than 460 kg/(h·m$^2$) to 1000 kg/(h·m$^2$).

Unlike the prior art, the process according to the invention additionally takes account of the gas temperature in the reactor. This temperature is preferably measured with a measuring unit, for example with a temperature sensor (e.g. a thermocouple) in the reactor or more preferably at the gas outlet. This temperature is limited to a maximum of 650° C. It is preferably 400 to 650° C.

The chlorosilane concentration in the silicon-containing reaction gas in the process according to the invention is at a constant high value of 22 to 30 mol %, preferably 25 to 28 mol %, of chlorosilane from the start of the process until a gas temperature of 650° C. is attained. From a gas temperature of 650° C., the chlorosilane concentration is lowered to a lower value of 15 to 25 mol %, preferably 19 to 22 mol %, by adding hydrogen until the end of the deposition. The chlorosilane concentration in the reactor is adjusted by varying the amount of hydrogen in the reaction gas mixture. The gas temperature in the reactor is preferably also regulated via the variation in the amount of hydrogen in the reaction gas mixture.

It is additionally essential to the invention to determine the rod temperature at the underside of the bridge and hence at the hottest site on the rod. In order to work with the maximum possible deposition temperature over the entire deposition phase, as is preferred in the process according to the invention, there is no alternative to this form of temperature measurement, since the relationship between bridge temperature and surface area of the vertical rods depends on many process parameters, and hence a change in the rod thickness, gas rate, molar percentage, reactor geometry, plant pressures with the same temperature at the underside of the bridge causes different temperatures to be established at the surface of the vertical rods. The temperature of the vertical rods also varies more strongly as a function of the gas flow conditions and the gas rates than the temperature of the bridge.

Figure 2:
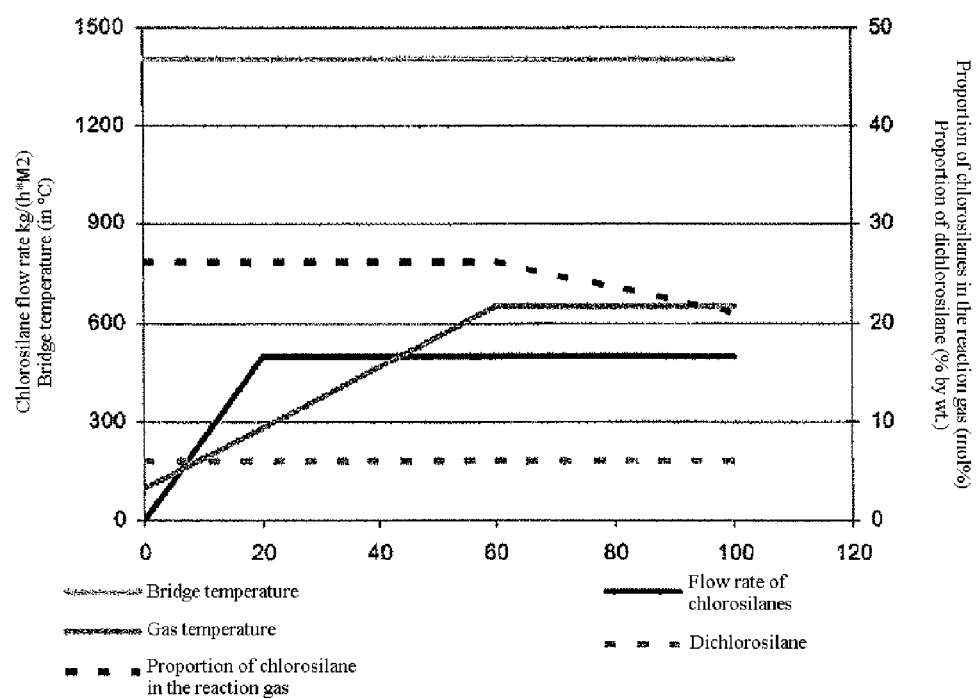
FIG. 2 shows the plot against time (X axis: time in h) of the process parameters bridge temperature (° C.), gas temperature (° C.), molar proportion of chlorosilane in the reaction gas (mol%), specific flow rate of chlorosilanes ($kg/(h \cdot m^2)$), and dichlorosilane content (% by wt.) in the chlorosilane mixture, in the course of performance of one embodiment of the process according to the invention.

The described combination of bridge temperature, rapid maximization of the chlorosilane addition rate, dichlorosilane content in the chlorosilane mixture, gas temperature and molar chlorosilane/hydrogen ratio or proportion of chlorosilane in the reaction gas gives the inventive brittle polysilicon rods. A preferred form of the process regime is summarized in FIG. 2.

The process according to the invention requires only a specific energy demand of less than 40 kWh per kg of polysilicon and achieves deposition rates of significantly greater than 1.6 mm of silicon/h. Compared to this, Siemens deposition processes according to the prior art have a specific energy demand of 80 to 100 kWh/kg and achieve a deposition rate of 1 to 1.5 mm/h (Handbook of Semiconductor Silicon Technology, William C. O'Mara, Robert B. Herring, and Lee P. Hunt, Noyes Publications, Park Ridge, N.J., USA, 1990, page 77).

The examples which follow serve to further illustrate the invention.

EXAMPLE 1

Production of an Inventive Polysilicon Rod

In a Siemens reactor, an inventive polysilicon rod was produced by depositing silicon from a reaction gas consisting of a chlorosilane mixture and hydrogen on a heated thin silicon rod. The chlorosilane mixture consisted of 94 percent by weight of trichlorosilane and 6 percent by weight of dichlorosilane. The flow rates of chlorosilane mixture and hydrogen were regulated independently of one another. The chlorosilane flow was increased to 460 kg of chlorosilane per h and $m^2$ of silicon surface area (kg/(h·m$^2$)) within 15 hours from the start of deposition and then kept constant over the rest of the batch run time.

The gas temperature was measured with a temperature sensor at the gas outlet from the reactor. The hydrogen flow was increased proportionally to the chlorosilane flow up to a gas temperature of 650° C., such that the molar proportion of chlorosilane in the reaction gas was constant at 26 mol %, then it was adjusted in accordance with the invention such that the gas temperature did not rise any further, i.e. remained limited to 650° C.

The temperature of the silicon rod was measured at the underside of the bridge with a radiation pyrometer and kept constant at 1400° C. over the entire batch run time.

The deposition was ended at a diameter of the polysilicon rod of 150 mm. The polysilicon rods thus produced had the following properties:

Areal proportion of silicon for electrical conduction: 97%
Total porosity of the deposited polysilicon of 0.023
Apparent density: 2.275 g/cm$^3$
Compressive strength (measured to DIN 51910): 58 N/mm$^2$
Flexural strength (measured to DIN 51902): 1.6 N/mm$^2$

COMPARATIVE EXAMPLE 1

Production of a Polysilicon Rod from "Compact silicon"

In a Siemens reactor, a compact polysilicon rod was produced by depositing silicon with a reaction gas consisting of a chlorosilane mixture and hydrogen on a heated thin silicon rod. The chlorosilane mixture consisted of 100% by weight of trichlorosilane.

The flow rates of chlorosilane mixture and hydrogen were regulated independently of one another. The chlorosilane flow was increased to 350 kg of chlorosilane per h and m² of silicon surface area (kg/(h·m²)) within 30 hours from the start of deposition and then kept constant over the rest of the batch run time. The gas temperature was measured with a temperature sensor at the gas outlet and did not exceed 500° C. The hydrogen flow was increased proportionally to the chlorosilane flow, such that the molar proportion of chlorosilane was constant at 20 mol %. The temperature of the silicon rod was measured with a radiation pyrometer at the surface of a vertical rod and kept constant at 1030° C. over the entire batch run time.

The deposition was ended at a diameter of the polysilicon rod of 150 mm. The polysilicon rods thus produced had the following properties:
Areal proportion of silicon for electrical conduction: 100%
Total porosity of the deposited polysilicon of 0 (i.e. not porous but compact, with no pores, holes, seams)
Apparent density equal to true density: 2.329 g/cm³
Compressive strength (measured to DIN 51910): 170 N/mm²
Flexural strength (measured to DIN 51902): 160 N/mm²

COMPARATIVE EXAMPLE 2

Production of a Polysilicon Rod from "Compact Silicon"

In a Siemens reactor, a compact polysilicon rod is produced as described in the Handbook of Semiconductor Silicon Technology, 1990, pages 1 to 81.

For this purpose, silicon was deposited with a reaction gas consisting of a chlorosilane mixture and hydrogen on a heated thin silicon rod. The chlorosilane mixture consisted of 100 percent by weight of trichlorosilane. The gas temperature was measured with a temperature sensor at the gas outlet and did not exceed 575° C. The hydrogen flow was increased proportionally to the chlorosilane flow, such that the molar proportion of chlorosilane was 10 mol %.

The temperature of the silicon rod was measured with a radiation pyrometer at the surface of a vertical rod and was kept constant at 1030° C. over the entire batch run time. The energy demand was 90 kWh/kg of silicon and the deposition rate 1.2 mm/h.

The deposition was ended at a diameter of the polysilicon rod of 150 mm. The polysilicon rods thus produced had the following properties:
Areal proportion of silicon for electrical conduction: 100%
Total porosity of the deposited polysilicon of 0 (i.e. not porous but compact, with no pores, holes, seams)
Apparent density equal to true density: 2.329 g/cm³
Compressive strength (measured to DIN 51910): 170 N/mm²
Flexural strength (measured to DIN 51902): 160 N/mm²

EXAMPLE 2

Production of Poly Fragments

One polysilicon rod each from example 1 and comparative examples 1 and 2 was comminuted with a tungsten carbide hammer. The resulting fragments had a W/L ratio and a sphericity in the range of 0.7 to 1 and an identical fragment size distribution in the range of 1 to 150 mm. They thus corresponded to the customary specification of poly fragments, which is indispensable for further processing.

The fragment size distribution of the comminuted poly rod from example 1 had a proportion by mass of 77% in the 20-150 mm fragment size range, 11% in the 20-65 mm range, 8% in the 5-45 mm range and 4% in the less than 15 mm range.

The fragment size distribution of the comminuted poly rod from comparative example 1 had a proportion by mass of 74% in the 20-150 mm fragment size range, 12% in the 20-65 mm range, 9% in the 5-45 mm range and 5% in the less than 15 mm range.

The fragment size distribution of the comminuted poly rod from comparative example 2 had a proportion by mass of 79% in the 20-150 mm fragment size range, 10% in the 20-65 mm range, 7% in the 5-45 mm range and 4% in the less than 15 mm range.

The sum of the metallic surface impurities in the inventive fragments was between 1 and 12 ppbw, and the contamination of the surface by anions, determined with the aid of capillary zone electrophoresis, was less than 62 ppb of nitrate and 1 ppb of fluoride.

As a result of the higher strength of the compact silicon rods of the comparative examples, the mechanical demands and the energy expenditure for comminution of these polysilicon rods were significantly greater. The higher mechanical demands result in higher surface contamination of the fragments produced therefrom.

The contamination of the fragments of the comparative examples was therefore significantly higher.

The sum of the metallic surface impurities was more than 100 ppbw. These fragments cannot be used in the semiconductor or photovoltaics industry without an additional cleaning step.

In order to be able to use the fragments in the semiconductor and photovoltaics industries, the fragments are cleaned in acid baths as described in the prior art, for example U.S. Pat. No. 6,309,467.

This results in contamination of the polysilicon fragment surface by anions. Determined with the aid of capillary zone electrophoresis, the anion values after a cleaning step are greater than 62 ppb of nitrate and 1 ppb of fluoride.

The invention claimed is:

1. A polycrystalline silicon rod having a rod cross section with an areal proportion of 50-99% silicon available for electrical conduction and having a flexural strength of 0.1 to 80 N/mm².

2. The polycrystalline silicon rod of claim 1, wherein the silicon rod has a compressive strength of 1 to 100 N/mm², and an apparent density in the range of 2.0 to 2.3 g/cm³, and a total porosity of 0.01 to 0.2.

3. The polycrystalline silicon rod of claim 1, wherein the silicon rod has a silicon layer with a homogeneous structure grown on in a Siemens process, which homogenous structure comprises pores, seams, gaps, cracks and fissures.

4. The polycrystalline silicon rod of claim 2, wherein the silicon rod has a silicon layer with a homogeneous structure grown on in a Siemens process, which homogenous structure comprises pores, seams, gaps, cracks and fissures.

5. Polysilicon silicon fragments derived from comminuting the polycrystalline silicon rod of claim 1 which have a fragment size distribution from 1 to 150 mm and a sphericity of 0.7 to 1.0 and a width to length ratio in the range of 0.7 to 1.0, wherein the fragments have a surface with a total of metallic impurities between 1 and 12 ppbw and the surface has less than 62 ppb of nitrate and less than 1 ppb of fluoride.

6. The polycrystalline fragments of claim 5, wherein the metallic impurities are measured directly after comminution of the polysilicon rod into fragments and before any subsequent purification steps.

7. The polycrystalline silicon rod of claim 1 which is grown by the Siemens process, and consists of silicon as grown.

8. A process for producing the polycrystalline silicon rod of claim 1, wherein a stream of a reaction gas comprising a chlorosilane mixture and hydrogen is introduced into a reactor and high-purity polysilicon is deposited on a filament rod of silicon heated by direct passage of current, the filament rod being formed from two vertical sections and one horizontal section, the horizontal section forming a linking bridge between the vertical sections, wherein the chlorosilane mixture is a mixture comprising di- and trichlorosilane and the passage of current through the filament rod is regulated such that the filament rod has a temperature at the underside of the bridge between 1300 and 1413° C.; the temperature of the reaction gases measured in the reactor is adjusted so as to be not more than 650° C.; and the flow rate of the chlorosilane mixture is adjusted to its maximum value within less than 30 hours from the start of supply of the chlorosilane mixture.

9. The process of claim 8, wherein the flow rate of the chlorosilane mixture is adjusted to its maximum value within 5 hours from the start of supply of the chlorosilane mixture.

10. The process of claim 8, wherein the temperature at the underside of the bridge is kept constant at about 1400° C. over an entire batch run time.

11. The process of claim 8, wherein the chlorosilane rate is increased to the maximum rate within 15 hours.

12. The process of claim 10, wherein the chlorosilane rate is increased to the maximum rate within 15 hours.

13. The process of claim 8, wherein the specific flow rate of chlorosilanes is in the range of 400 to 1000 kg of chlorosilanes per hour per $m^2$ of silicon rod area.

14. The process of claim 8, wherein the specific flow rate of chlorosilanes is in the range of about 500 kg of chlorosilanes per hour per $m^2$ of silicon rod area.

\* \* \* \* \*